United States Patent [19]
Geislinger

[11] B 3,996,767
[45] Dec. 14, 1976

[54] ELASTIC COUPLING
[76] Inventor: Leonhard Geislinger, Hofelgasse 26, A-5020 Salzburg, Austria
[22] Filed: Sept. 25, 1974
[21] Appl. No.: 509,043
[44] Published under the second Trial Voluntary Protest Program on February 24, 1976 as document No. B 509,043.
[30] Foreign Application Priority Data
Sept. 25, 1973  Austria .............................. 8254/73
[52] U.S. Cl. .................................. 64/27 L; 64/15 R
[51] Int. Cl.² .......................................... F16D 3/14
[58] Field of Search ............... 64/27 L, 27 B, 27 R, 64/26, 15 B, 15 R

[56] References Cited
UNITED STATES PATENTS

| 1,990,683 | 2/1935 | Wood | 64/27 L |
| 2,029,516 | 2/1936 | Tower | 64/27 L |
| 2,266,872 | 12/1941 | Kuhns et al. | 64/27 L |
| 2,363,257 | 11/1944 | Mitteucci | 64/27 L |
| 2,379,175 | 6/1945 | Mulheim | 64/27 L |

FOREIGN PATENTS OR APPLICATIONS
1,206,219   12/1965   Germany ........................... 64/27 L Primary Examiner—Samuel Scott
Assistant Examiner—Randall Heald
Attorney, Agent, or Firm—Kurt Kelman

[57] ABSTRACT

An elastic coupling for transmitting torque from a driving shaft to a driven shaft and for damping torsional vibrations comprises packets of flexible leaf springs locked between a hub connected to one shaft and a clamping ring concentric with the hub. The hub and clamping ring define an annular chamber filled with a damping fluid. The packets of leaf springs extend radially and have outer leaf springs having a transverse cross section which tapers inwardly from an outer to an inner end. The outer leaf springs are so dimensioned that their maximum flexure is at least equal to the difference between the thicknesses of the outer and inner leaf spring ends.

6 Claims, 5 Drawing Figures

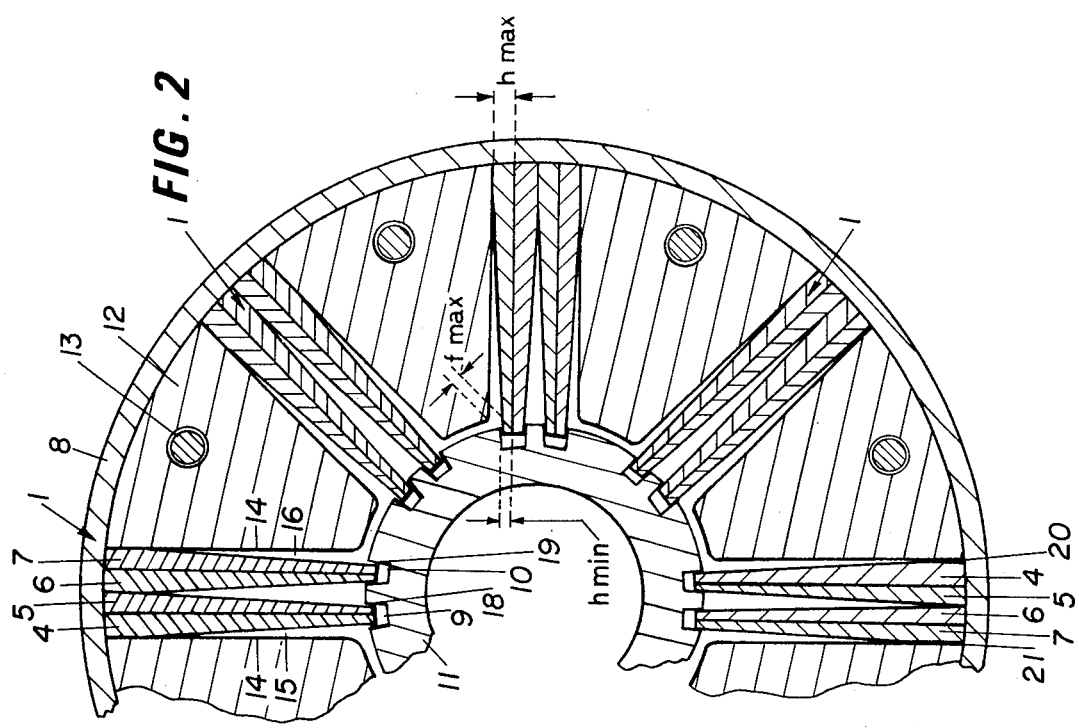
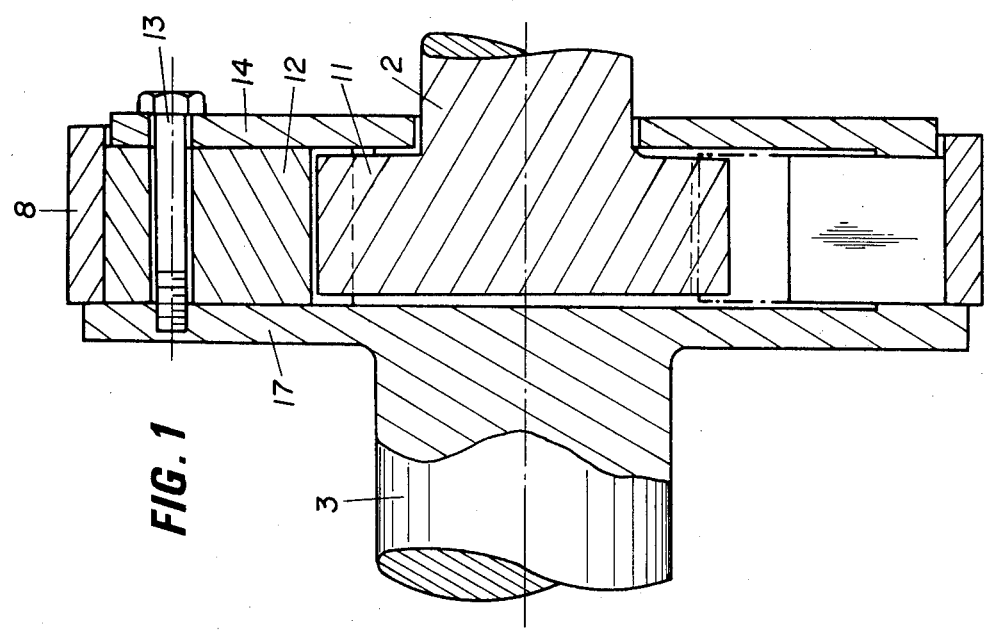

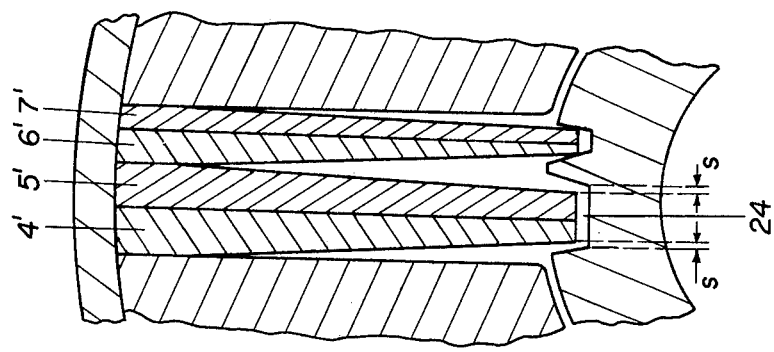
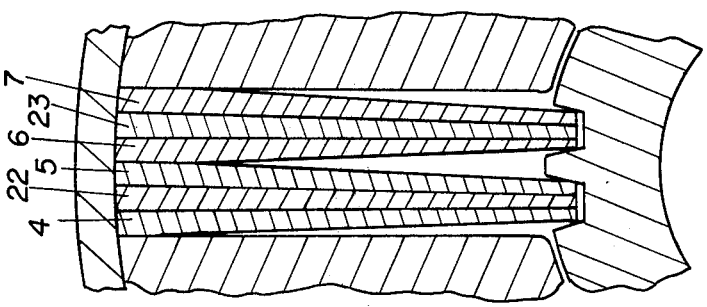
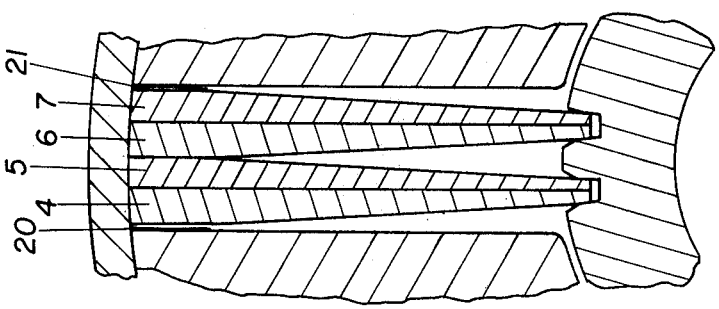

ELASTIC COUPLING

The present invention relates to improvements in an elastic coupling for transmitting torque from a driving or primary element, such as a shaft, rotating about an axis to a driven or secondary element, such as a shaft, and for damping torsional vibrations during rotation.

German Pat. No. 749,197 discloses an elastic coupling of this type which comprises packets of flexible leaf springs extending radially in a chamber filled with damping fluid, and wherein each of the packets has outer leaf springs having a cross section transverse to the axis which tapers radially inwardly from an outer to an inner end thereof.

It is a primary object of this invention to simplify the structure and mounting of this type of elastic coupling for damping torsional vibrations.

This and other objects are accomplished in accordance with the invention with an elastic coupling which comprises a hub connected to one of the elements, a clamping ring concentric with the hub, the hub and damping ring defining therebetween an annular damping chamber, and a damping fluid in the chamber. Packets of flexible leaf springs are arranged in the chamber, preferably circumferentially spaced by intermediate wedge-shaped elements, and extend radially between the hub and the clamping ring, the clamping ring locking the leaf springs in position. Each packet has outer leaf springs having a cross section transverse to the axis which tapers radially inwardly from an outer end to an inner end thereof. The outer leaf springs are so dimensioned that their maximum flexure is at least equal to, and may exceed, the difference between the thickness of the leaf springs at their outer ends and the thickness of the leaf springs at their inner ends.

To enable an elastic coupling of the indicated type to transmit maximum torque while holding the coupling diameter to a minimum, it is desirable to mount a maximum number of packets of leaf springs in the damping chamber of the coupling. However, the indicated dimensioning of the outer leaf springs according to the present invention produces a very small ratio between the gage or thickness of the leaf springs and their length, resulting in a decrease in the width of the intermediate elements interleaved between the packets of leaf spring, particularly at the inner ends of the intermediate elements, as the number of leaf spring packets increases. This is disadvantageous not only in respect of the damping effect but also for the function of the intermediate elements as limit stops for the flexure of the leaf springs.

This difficulty has been overcome in accordance with one preferred embodiment of this invention by combining four leaf springs into forming each packet, each of the leaf springs having a flat surface and a surface inclined thereto. The flat surfaces of two adjacent ones of the leaf springs are in contact with each other. In this manner, the inner ends of the inside leaf springs of the packet will define a gap therebetween. This gap could be bridged by a spacer but, according to another preferred embodiment of the invention, the hub defines grooves extending in an axial direction and the inner ends of each two adjacent leaf springs are received in a respective hub groove. In this manner, an axially extending rib between the two hub grooves receiving the inner ends of the two adjacent leaf springs will bridge the gap between the inner ends of the inside leaf springs and the outer leaf springs will engage the flanks of the two hub grooves during flexing of the leaf spring packet. This will favorably influence the wear of the leaf springs at these locations.

The above and other objects, advantages and features of the present invention will become more apparent from the following detailed description of some now preferred embodiments thereof, taken in conjunction with the accompanying drawing wherein FIG. 1 is an axial section of an elastic coupling, FIG. 2 is a partial transverse section of the coupling, and FIGS. 3 and 5 are partial transverse sections showing three modified packets of leaf springs useful for the elastic coupling.

Referring now to the drawing and first to FIGS. 1 and 2, the illustrated elastic coupling for transmitting torque from a driving element rotating about an axis to a coaxial driven element and for damping torsional vibrations is shown as a coupling between shafts 2 and 3 constituting the primary or driving and secondary or driven elements. The coupling comprises hub 11 integral with, or keyed to, shaft 2 and clamping ring 8 concentric with the hub. Coupling flange 17 is integral with, or keyed to, shaft 3 and cover plate 14 is axially spaced therefrom, with hub 11 being arranged between flange 17 and cover plate 14. The hub and clamping ring define therebetween an annular damping chamber delimited at one end by coupling flange 17 and at the other end by cover plate 14.

Packets 1 of flexible leaf springs 4 to 7 are arranged in the chamber and extend radially between hub 11 and clamping ring 8, the clamping ring locking the leaf springs in position. Each outer leaf spring 4, 7 has a cross section transverse to the axis (see FIG. 2) which tapers radially inwardly from an outer end at the clamping ring to an inner end thereof at the hub. In the illustrated embodiment, the outer ends of the leaf springs have a constant thickness for a short distance extending inwardly from clamping ring 8. Hub 11 defines pairs of grooves 9, 10 extending in an axial direction, the inner ends of each two adjacent leaf springs of each packet being received in respective ones of the grooves, as clearly shown in FIG. 2.

Intermediate wedge-shaped elements 12 are arranged between respective packets 1 of leaf springs, and the leaf spring packets and the wedge-shaped elements are assembled by placing clamping ring 8 thereabout under tangential tension. Threaded fastening bolts 13 connect cover plate 14 to coupling flange 17 and pass through intermediate elements 12 to hold the entire coupling in assembled condition.

In the illustrated embodiments, each packet comprises four leaf springs — two outer leaf springs 4, 7 and two inside leaf springs 5, 6 — and each leaf spring has a flat surface and a surface inclined thereto. The flat surfaces of two adjacent leaf springs 4, 5 and 6, 7 are in contact with each other. In this arrangement, gaps are formed between inside leaf springs 5, 6 and each outer leaf spring 4, 7 and an adjacent intermediate wedge-shaped element 12. The damping fluid, such as oil, in the coupling chamber fills these gaps.

In the embodiment of FIG. 2, the outer leaf springs are so dimensioned that their maximum flexure $f_{max}$ is equal to the difference between the thickness $h_{max}$ of the leaf springs at their outer ends and the thickness $h_{min}$ of the leaf springs at their inner ends.

In the embodiment of FIG. 2, when shaft 2 with hub 11 is rotated counterclockwise, each packet 1 of leaf springs is subjected to pressure by flanks 18, 19 of grooves 9, 10. This will cause the damping liquid to be displaced from gaps 15 into gaps 16 through a channel extending between the inner ends of the wedge-shaped intermediate elements and hub 11, these inner ends being radially spaced from the hub. This flow of damping liquid will cause damping of torsional vibrations.

In the embodiment of the leaf spring packet of FIG. 3, spacers 20 and 21 are arranged at the outer ends of the outer ends of the outer leaf springs between these outer leaf spring ends and the adjacent intermediate wedge-spaced elements. In this modification, $f_{max}$ exceeds $h_{max} - h_{min}$. This modification offers a simple structure for adapting the stiffness of the elastic coupling to desired operating conditions.

While the flat faces in pairs of adjacent leaf springs have been shown positioned in contact with each other in the modifications of FIGS. 2 and 3, FIG. 4 shows a modification wherein intermediate leaf springs 22, 23 are arranged between the flat faces of the adjacent leaf springs in each pair.

Finally, FIG. 5 illustrates a packet of leaf springs wherein leaf springs of different gage of thickness are combined in a single packet. As shown, the thickness of leaf springs 4', 5' considerably exceeds that of leaf springs 6', 7', at least as far as $h_{max}$ is concerned. Furthermore, hub groove 24 receiving the inner ends of leaf springs 4', 5' exceeds in width the combined thickness of the inner ends of these leaf springs. Thus, upon rotation of the hub in a counterclockwise direction, the flanks of the groove receiving the inner ends of leaf springs 6', 7' will subject these leaf springs to pressure before the other pair of leaf springs is flexed. Thus, only after the rotation has proceeded a further distance $s$, leaf springs 4', 5' will transmit torque. This coupling is considerably more elastic at low than at high torque.

What is claimed is:

1. An elastic coupling for transmitting torque from a driving element rotating about an axis to a driven element and for damping torsional vibrations, the coupling comprising
    1. a hub connected to one of the elements,
    2. a clamping ring concentric with the hub,
        a. the hub and the clamping ring defining therebetween an annular damping chamber,
    3. a damping fluid in the chamber, and
    4. packets of flexible leaf springs arranged in the chamber and extending radially between the hub and the clamping ring, the clamping ring locking the leaf springs in position,
        a. each of the packets having outer leaf springs having a cross section transverse to the axis which tapers radially inwardly from an outer end to an inner end thereof, and
        b. the outer leaf springs being so dimensioned that their maximum flexure is at least equal to the difference between the thickness of the leaf springs at their outer ends and the thickness of the leaf springs at their inner ends.

2. The elastic coupling of claim 1, wherein each of the packets comprises four leaf springs, each of the leaf springs having a flat surface and a surface inclined thereto, the flat surfaces of two adjacent ones of the leaf springs being in contact with each other.

3. The elastic coupling of claim 2, wherein the hub defines grooves extending in an axial direction, the inner ends of each two adjacent ones of the leaf springs being received in a respective one of the hub grooves.

4. The elastic coupling of claim 1, further comprising a coupling flange on one of the elements, a cover plate axially spaced therefrom, the damping fluid chamber extending between the coupling flange and the cover plate, intermediate wedge-shaped elements arranged in the chamber between respective ones of the packets of leaf springs, and fastening means connecting the cover plate to the coupling flange and passing through the intermediate elements to hold the same in position.

5. The elastic coupling of claim 1, wherein the hub defines grooves extending in an axial direction, the inner ends of the leaf springs of each packet being received in respsective ones of the hub grooves, the width of the grooves and the thickness of the inner leaf spring ends being so related that the inner end of one of the leaf springs engages the flanks of the groove wherein it is received while the inner end of another leaf spring of the packet is spaced from the flanks of the groove therein the other leaf spring is received.

6. The elastic coupling of claim 1, further comprising wedge-shaped intermediate elements mounted between respective ones of the packets of flexible leaf springs, the intermediate elements having straight walls facing the outer leaf springs of the packets.

* * * * *